(12) United States Patent
Abraham et al.

(10) Patent No.: US 9,137,766 B2
(45) Date of Patent: Sep. 15, 2015

(54) SYSTEMS AND METHODS FOR SYNCHRONIZATION OF WIRELESS DEVICES IN A PEER-TO-PEER NETWORK

(71) Applicant: QUALCOMM Incorporated, San Diego, CA (US)

(72) Inventors: Santosh Paul Abraham, San Diego, CA (US); George Cherian, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/024,461

(22) Filed: Sep. 11, 2013

(65) Prior Publication Data

US 2014/0119357 A1     May 1, 2014

Related U.S. Application Data

(60) Provisional application No. 61/718,882, filed on Oct. 26, 2012, provisional application No. 61/723,277, filed on Nov. 6, 2012.

(51) Int. Cl.
*H04W 56/00* (2009.01)

(52) U.S. Cl.
CPC .................................. *H04W 56/001* (2013.01)

(58) Field of Classification Search
CPC ....................................... H04W 56/001–56/002
See application file for complete search history.

(56) References Cited

U.S. PATENT DOCUMENTS

| 6,633,590 | B1* | 10/2003 | Garofalo et al. | 370/507 |
|---|---|---|---|---|
| 7,480,315 | B2* | 1/2009 | Virdi et al. | 370/509 |
| 8,213,405 | B2 | 7/2012 | Horn et al. | |
| 2001/0022823 | A1* | 9/2001 | Renaud | 375/359 |
| 2004/0047307 | A1* | 3/2004 | Yoon et al. | 370/324 |
| 2007/0293218 | A1 | 12/2007 | Meylan et al. | |
| 2011/0141965 | A1 | 6/2011 | Kasslin et al. | |
| 2012/0328061 | A1 | 12/2012 | Chow | |

OTHER PUBLICATIONS

Chen S., et al., "Time Synchronization for Predictable and Secure Data Collection in Wireless Sensor Networks," The Sixth Annual Mediterranean Ad Hoc Networking WorkShop, Jun. 12-15, 2007, pp. 165-172.

* cited by examiner

*Primary Examiner* — Hassan Kizzou
*Assistant Examiner* — Ashil Farahmand
(74) *Attorney, Agent, or Firm* — Knobbe Martens Olson & Bear LLP

(57) ABSTRACT

Methods, devices, and computer program products for synchronization of wireless devices in a peer-to-peer network are described herein. In one aspect, a method for synchronizing a wireless communication apparatus is provided. The method includes receiving, at the wireless communication apparatus, one or more messages including one or more received time values. The method further includes updating a time value of a clock signal of the wireless communication apparatus to a value derived from the received time values in response to determining that a magnitude of a difference between the time value and the derived time value is greater than a threshold.

16 Claims, 19 Drawing Sheets

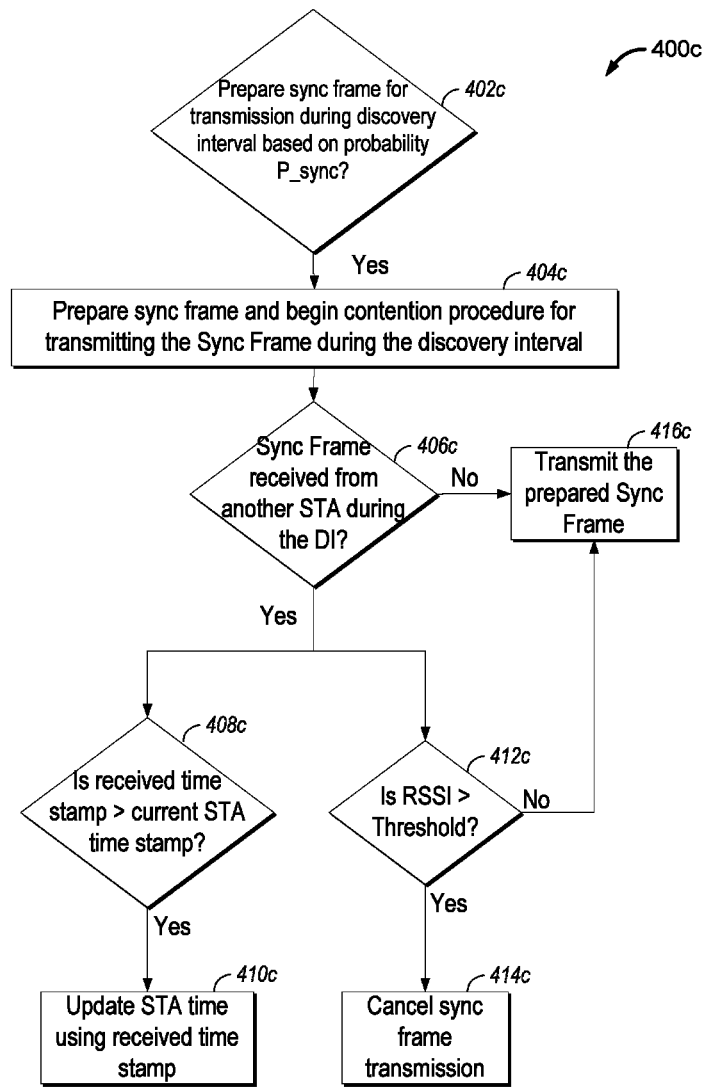

SYSTEMS AND METHODS FOR SYNCHRONIZATION OF WIRELESS DEVICES IN A PEER-TO-PEER NETWORK

CLAIM OF PRIORITY UNDER 35 U.S.C. §119

The present application for patent claims priority to Provisional Application No. 61/718,882 entitled "SYSTEMS AND METHODS FOR SYNCHRONIZATION OF WIRELESS DEVICES IN A PEER-TO-PEER NETWORK" filed Oct. 26, 2012, and assigned to the assignee hereof and hereby expressly incorporated by reference herein. The present application for patent further claims priority to Provisional Application No. 61/723,277 entitled "SYSTEMS AND METHODS FOR SYNCHRONIZATION OF WIRELESS DEVICES IN A PEER-TO-PEER NETWORK" filed Nov. 6, 2012, and assigned to the assignee hereof and hereby expressly incorporated by reference herein.

BACKGROUND

1. Field

The present application relates generally to wireless communications, and more specifically to systems, methods, and devices for synchronization of wireless devices in a peer-to-peer wireless network.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method for synchronizing a wireless communication apparatus. The method includes receiving, at the wireless communication apparatus, one or more messages including one or more received time values. The method further includes updating a time value of a clock signal of the wireless communication apparatus to a value derived from the received time values in response to determining that a magnitude of a difference between the time value and the derived time value is greater than a threshold.

Another aspect of the disclosure provides a method of wireless communication. The method includes determining, at a wireless communication apparatus, a first time interval since transmitting a message including a time value of a clock signal of the wireless communication apparatus. The method further includes determining, at the wireless communication apparatus, a second time interval since updating the time value of the wireless communication apparatus. The method further includes transmitting a message comprising content that is based on comparing the first time interval to a first threshold and comparing the second time interval to a second threshold.

Another aspect of the disclosure provides a method for synchronizing a wireless communication apparatus. The method includes selectively preparing a synchronization message for transmission during a discovery time interval of a discovery time period based on a probability value corresponding to a frequency for preparing the synchronization message over a plurality of discovery time periods. The synchronization message includes a first timestamp of the wireless communication apparatus. The method further includes initiating a contention based process for transmitting the synchronization message in response to preparing the synchronization message. The method further includes selectively updating a time value of the wireless communication apparatus in response to receiving one or more received synchronization messages from other wireless communication apparatuses during the discovery interval. The one or more received synchronization messages include one or more received timestamps of the other wireless communication apparatuses. Updating the time value including updating based on one or more criteria and the received timestamps. The method further includes transmitting the synchronization message in response to determining an absence any received synchronization messages during the discovery interval.

BRIEF DESCRIPTION OF THE DRAWINGS

FIG. 4C is a flowchart of a method for synchronization that is based on a received signal strength indication.

DETAILED DESCRIPTION

Figure 1A:
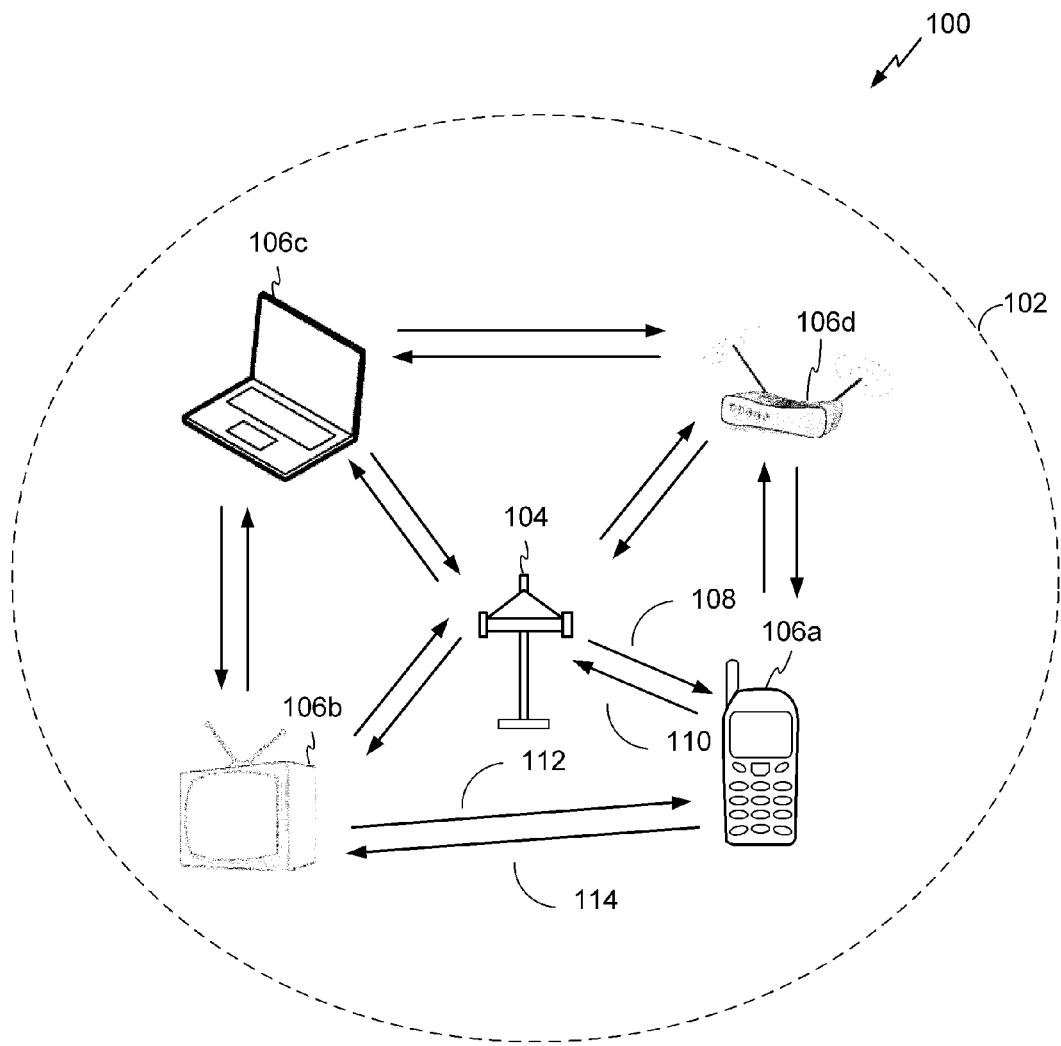
FIG. 1A illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1A illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1A.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs. Some possible communication links between STAs are illustrated in FIG. 1A. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as a peer-to-peer network between the STAs. Accordingly, the functions of the AP 104 described herein may alternatively be performed by one or more of the STAs.

Figure 1B:
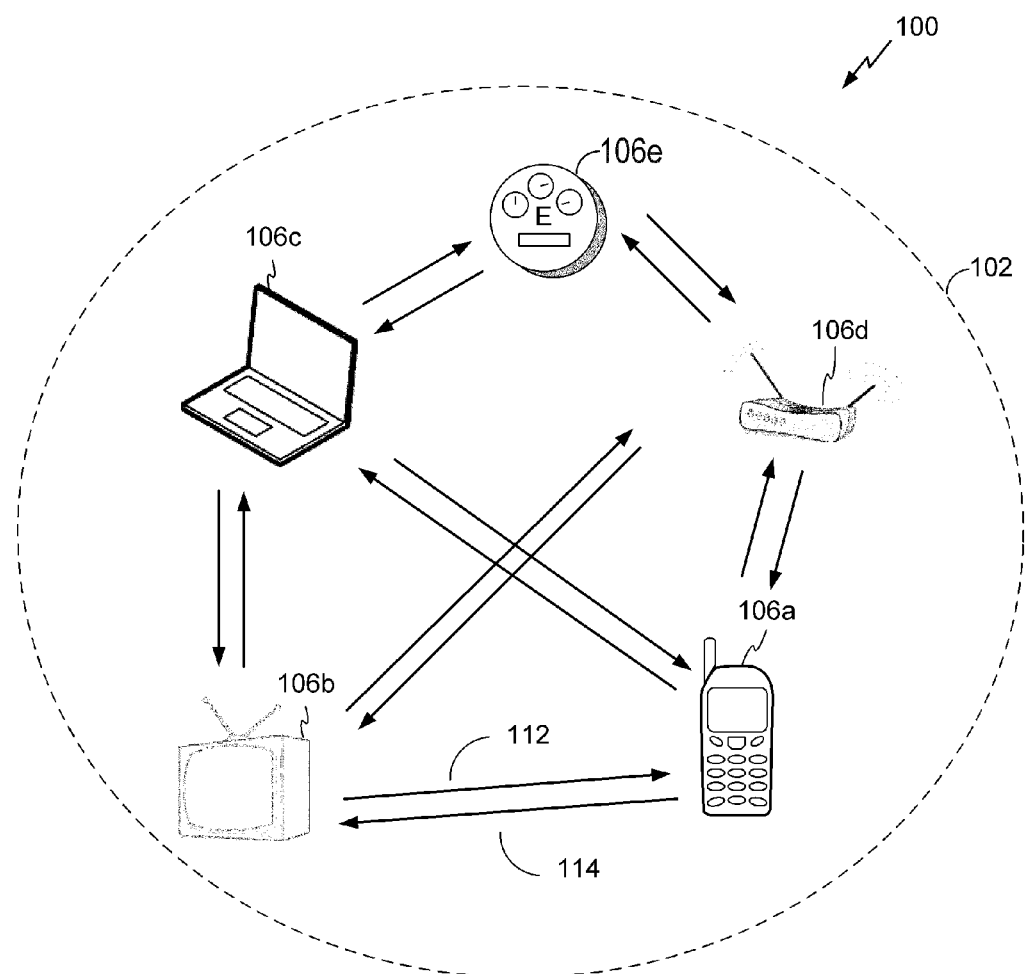
FIG. 1B illustrates another example of a wireless communication system in which aspects of the present disclosure may be employed.

FIG. 1B illustrates an example of a wireless communication system 100 that may function as a peer-to-peer network, in which aspects of the present disclosure may be employed. For example, the wireless communication system 100 shown in FIG. 1B shows STAs, 106b, 106c, 106d, and 106e that may communicate with each other without the presence of an AP. As such, the STAs, 106b, 106c, 106d, and 106e may be configured to communicate in different ways to coordinate transmission and reception of messages to prevent interference and accomplish various tasks. In one aspect, the network shown in FIG. 1A or 1B may configured as a "near-me are network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

Figure 2:
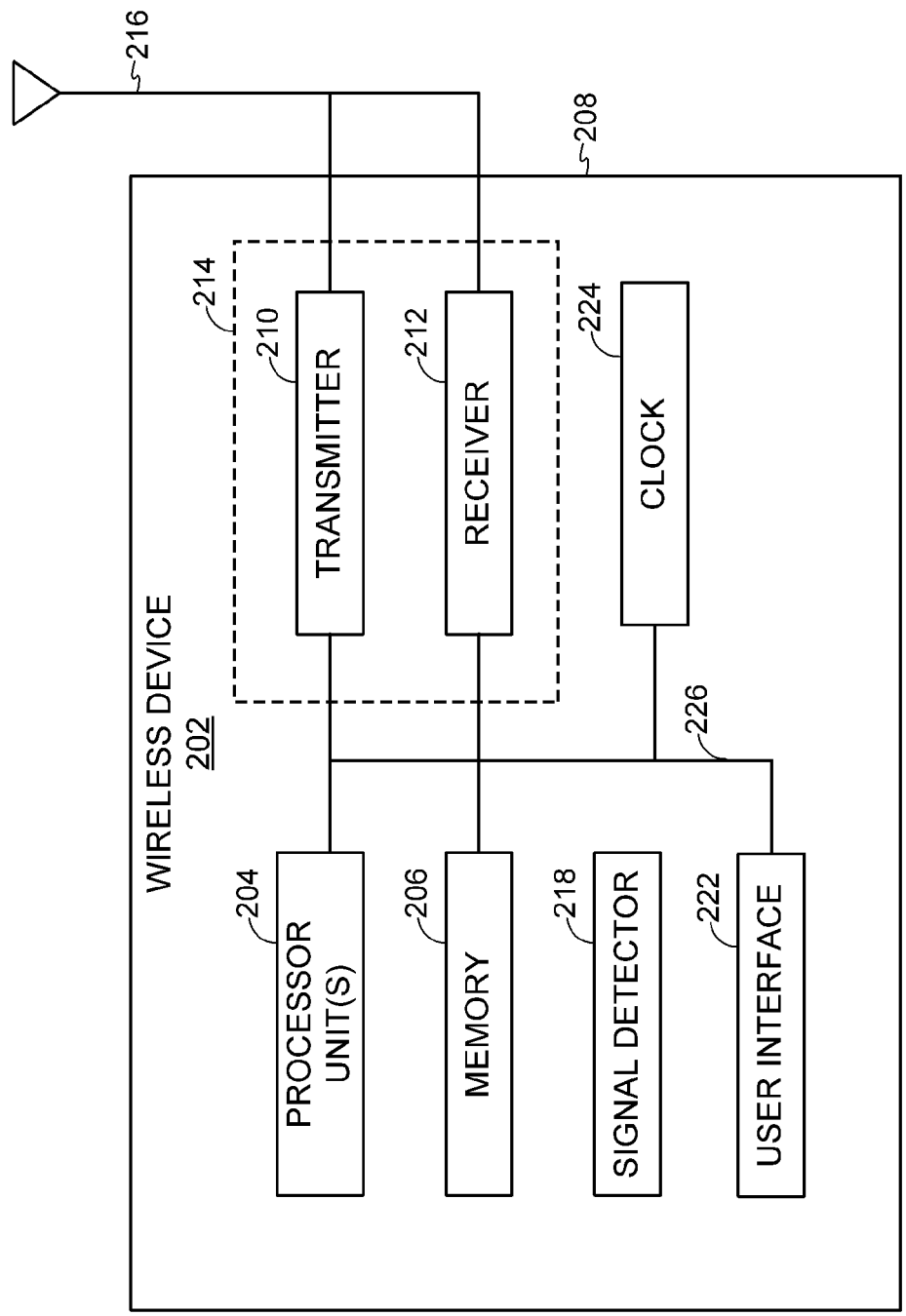
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In addition, the wireless device 202 may include a clock 224 configured to generate a clock signal that is used to coordinate and synchronize activities of the wireless device 202. In some configurations, the processor 204 may include the clock 224. The processor 204 may be configured to update the clock with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Devices, such as a group of STAs, 106b, 106c, 106d, and 106e shown in FIG. 1B, for example, may be used for neighborhood aware networking, or social-WiFi networking. For example, various stations within the network may communicate on a device to device (e.g., peer-to-peer communications) basis with one another regarding applications that each of the stations supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption. Furthermore, at least a portion of the discovery protocol may be related to coordinating and/or synchronizing activities of the STAs. It should be noted that a discovery packet may also be referred to as a discovery message or a discovery frame. It should also be noted that a paging or query packet may also be referred to as a paging or query message or a paging or query frame.

Furthermore, to ensure proper communication between multiple STAs, STAs may require information regarding characteristics of other STAs. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may always be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3A:
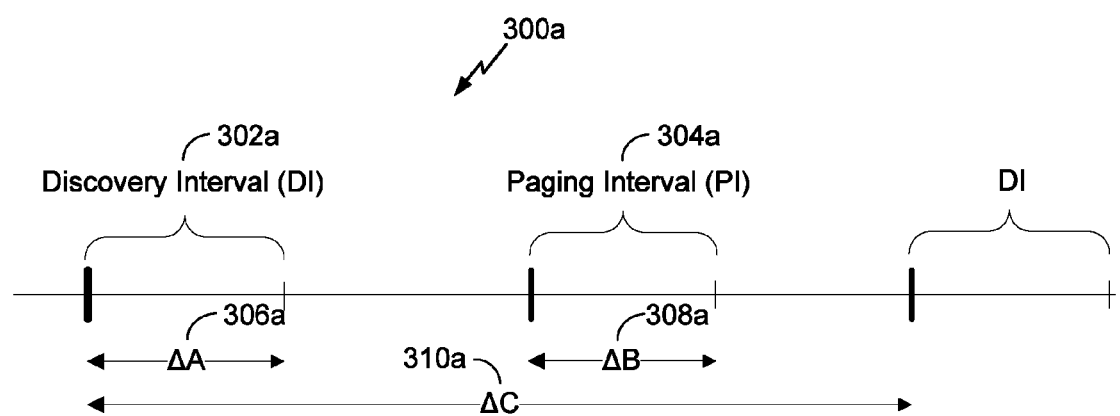
FIG. 3A illustrates an exemplary communication timeline in a wireless communication system in accordance with aspects of the present disclosure.

FIG. 3A illustrates an exemplary communication timeline 300a in a wireless communication system where STAs may communicate via one channel. In one aspect, the communication according to the timeline shown in FIG. 3A may be used in a peer-to-peer wireless network, such as the network shown in FIG. 1B. The exemplary communication timeline 300a may include a discovery interval (DI) 302a of a time duration ΔA 306a, a paging interval (PI) 304a of a time duration ΔB 308a, and an overall interval of a time duration ΔC 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3A. However, different combinations of remainder time periods are contemplated.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration ΔC 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration ΔC 310a, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awaken or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awaken or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration $\Delta C$ of the overall interval may be approximately one to five seconds. In other aspects, the overall interval may be less than one second or more than five seconds. The duration $\Delta A$ of the DI may equal approximately 16 milliseconds in some aspects while more or less than 16 milliseconds in other aspects. The duration $\Delta B$ of the PI may equal approximately the duration $\Delta A$ in some aspects. In other aspects, the duration $\Delta B$ may be more or less than the duration $\Delta A$.

Figures 3B, 3C:
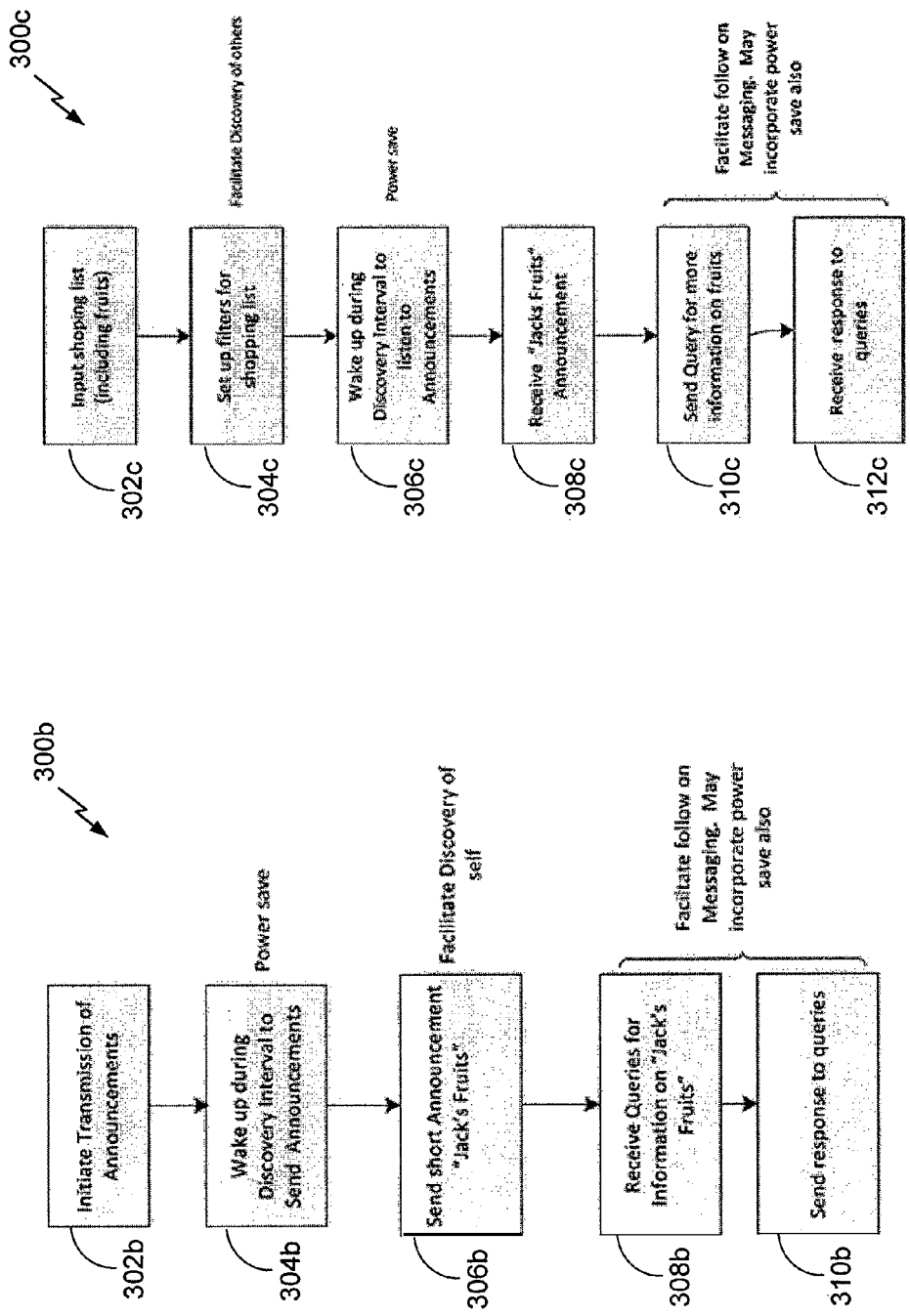
FIG. 3B is a flowchart of an exemplary process of discovering devices in a wireless communication system in accordance with aspects of the present disclosure.
FIG. 3c is a flowchart of an exemplary process of querying devices in a wireless communication system in accordance with aspects of the present disclosure.

FIG. 3B is a flowchart of an exemplary process 300b of discovering devices in a wireless communication system. The process 300b may be used to introduce two devices, such as two STAs and 106b. For example, a STA may advertise information about one or more of a plurality of services that may be of interest to various other STAs to which the information is directed. In some aspects, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3C is a flowchart of an exemplary process 300c of querying devices in a wireless communication system in accordance with aspects of the present disclosure. At block 302c, a STA may input a shopping list, which may include various vendors that a user of the STA may have an interest in. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310*c*, the STA sends a query for more information relating to the announcement, such as more information on Jack's Fruits. At block 312*c*, the STA may receive a response to one or more queries that the STA sent to other STAs regarding services offered by the other STAs.

It is desirable for the STAs described above (e.g., using a discovery protocol used in a social-WiFi network) to be able to advertise themselves, as well as discover services provided by other STAs, using a secure communication protocol and while keeping power consumption low. For example, it is desirable for a STA to advertise its offered services by securely sending discovery packets or messages and for the STA to discover services offered by other STAs by securely sending paging or query packets or messages while avoiding excess power consumption. For example in accordance with certain embodiments, STAs may "sleep" a majority of a time period and wake up for short discovery intervals as described to decrease power consumption. There may be certain conditions that allow the STAs to make use of short time intervals to decrease power consumption while still effectively allowing discovery and advertisement of services within the network. For example, it is desirable that STAs that transmit during the short time intervals "know" that intended receivers are active to receive the transmitting messages. In addition, it is further desirable that STAs that are searching for different services advertised by another STA 106 activate their receivers at the appropriate time to receive messages advertising services from other STAs. As such, certain embodiments described herein are directed to synchronization between different STAs to allow for performing device discovery as described above and for synchronization of other communications while allowing for reduced power consumption. For example certain embodiments are directed to synchronization so that STAs are activated for transmitting and receiving at the same time.

Furthermore, when STAs communicate without a central coordinator, such as an AP 104, synchronization of communications between the STAs may be desirable. As just described, if the STAs are not synchronized, the STAs may not receive discovery messages within the discovery interval, or be able to transmit paging requests within the correct paging interval to be received by other STAs. Clock synchronization therefore may provide a common reference time that may be used to determine timing of communication intervals such as the discovery interval 302*a* and the paging interval 304*a*. As each STA 106 operates independently of the other STAs, each generating an individual clock signal, the clock signals of the various STAs may become out of sync with each other or with the AP 104. For example, if a STA 106 is in a "doze" state, its clock signal may drift and define a reference time value that is faster or slower as compared to other clocks signals of other STAs.

Certain aspects described herein are directed to devices and methods for synchronization of clock signals of STAs operating in a peer-to-peer fashion. In some aspects, at least some of the STAs may transmit the current time value of their clock signals to the other STAs. For example, in accordance with certain embodiments, STAs may periodically transmit a 'sync' frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). Additionally, the use of sync messages may allow each clock in the network to be continuously maintained in synchronization with other clocks in the network. As described above with reference to FIG. 3A, discovery packets within a NAN are transmitted during a discovery interval 302*a* that occurs every discovery period. As such, sync messages may be sent during a discovery interval 302*a* for certain discovery periods.

It should be appreciated that a STA 106 may not transmit a sync frame every discovery interval. Rather, a probability value (P_sync), as is further described below, may be used to determine whether the STA 106 prepares and/or prepares a sync frame. As such, while at least some sync frames are sent for every discovery interval, not all the STAs participating in the NAN transmit a sync frame in every discovery interval. This may allow for reduced power consumption in transmitting sync frames while still enabling synchronization, compared to an alternative in which each STA transmits a synchronization frame in each discovery interval.

Figure 4A:
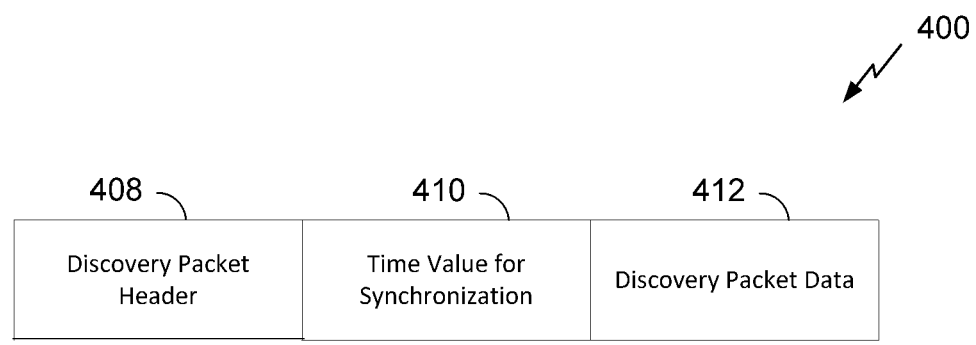
FIG. 4A illustrates a message that may include a time value for synchronization.

FIG. 4A illustrates a message 400 that may include a time value for synchronization. As described above, in some embodiments, the message 400 may correspond to a discovery message as described above. The message 400 may include a discovery packet header 408. The message may further include 410 a time value for synchronization 410. In some embodiments, the time value 410 may be included in the discovery packet header 408. The time value may correspond to a current time value of a clock signal of the STA 106 transmitting the message 400. The message 400 may further include discovery packet data 412. While FIG. 4A shows a discovery message serving as the sync message, it should be appreciated that according to other embodiments, the sync message may be sent apart from the discovery message. For example, in some aspects, the sync message may be a separate message or may be a part of another message other than the discovery message.

Figure 4B:
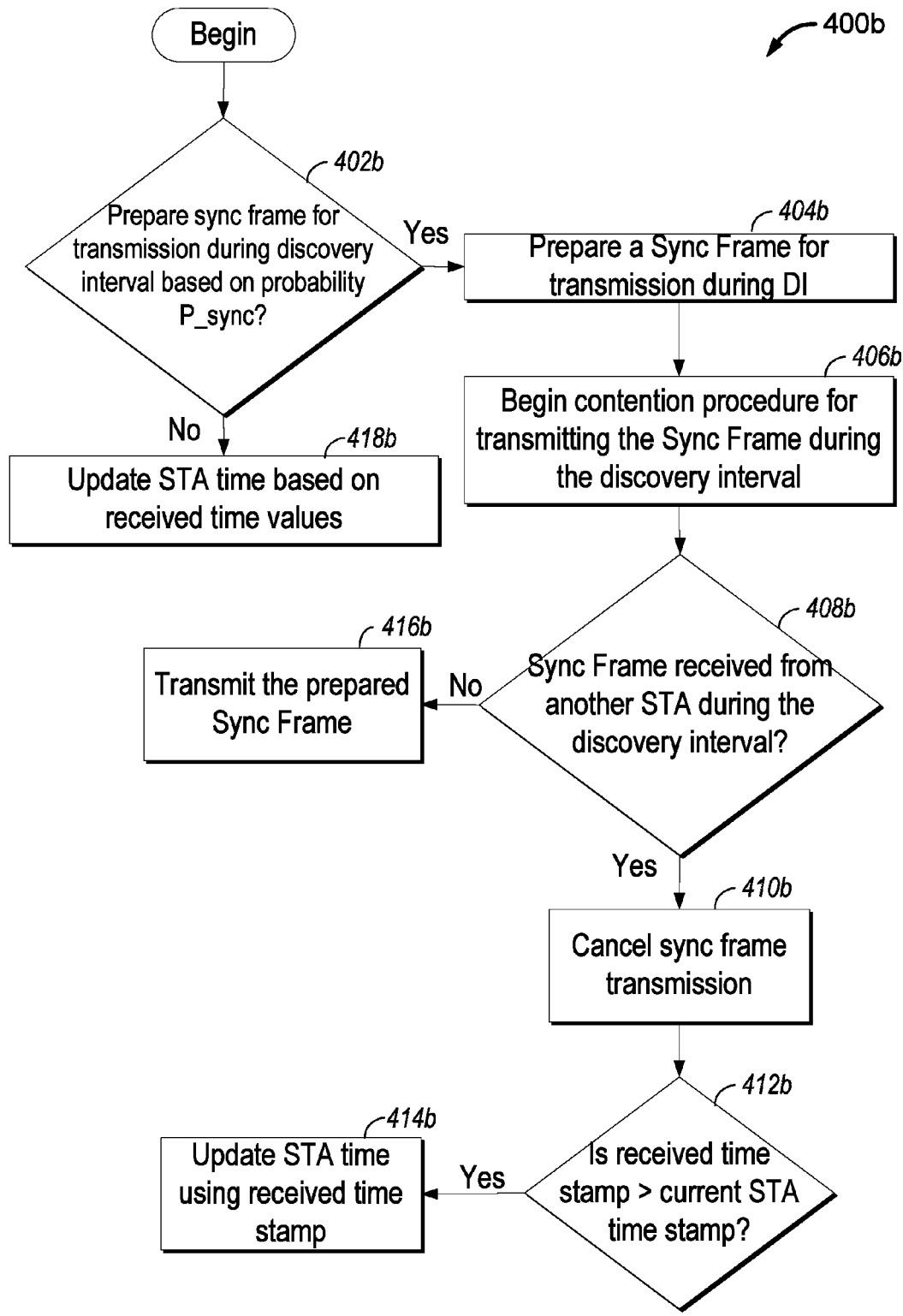
FIG. 4B is a flowchart of a method for transmitting and receiving a synchronization frame in accordance with an embodiment.

FIG. 4B is a flowchart of a method 400*b* for transmitting and receiving a synchronization frame in accordance with an embodiment. In one aspect, according to the method 400*b* of FIG. 4B, sync frames are only sent by a certain number of nodes within a NAN for any one discovery period. At decision block 402*b*, it is determined whether a sync frame is prepared for transmission for the discovery interval using a probability value P_sync. Stated another way, the STA 106 may determine whether to prepare a sync frame for transmission based on a probability value. For example, in some cases the probability value may be on the order of 1 such that the STA 106 prepares the sync frame for transmission for every discovery period. Alternatively, according to another embodiment, the probability may be on the order of, for example, 0.3 such that the STA 106 only prepares a sync frame for transmission during a discovery interval approximately every third discovery period. This can be done pseudo-randomly such that different STAs prepare sync frames for transmission during different discovery periods. In this way, sync frames may be transmitted in all discovery periods but not by each STA in each discovery period. In addition, the value of P_sync may be changed or adapted during operation. For example, the value of P_sync may be changed or adapted according to the number of STAs in the network, or the number of STAs nearby to an originating STA 106. For example, the value of P_sync may be reduced as the number of STAs in the neighborhood of the transmitting STA 106 increases, while in a network with fewer STAs, it may be beneficial to use a higher P_sync value. If it determined at block 402b not to prepare the sync frame, then at block 418b, the STA 106 may listen for time values from other STAs, such as those contained within sync frames transmitted by other STAs, and the STA may update its own time value based on received time values as necessary to be synchronized.

If a STA decides to prepare a sync frame based on the probability P_sync, then at block 404b, a sync frame is prepared for transmission. The sync frame may include a time stamp of the STA 106 as described above. In addition, the sync frame may include a network identifier that identifiers the NAN or "social Wi-Fi" network in which the STA 106 is participating. For example, the unique network identifier may be randomly generated when the network is first established between the STAs and may remain the same during the lifetime of the network. A STA 106 receiving a sync frame with a network identifier may only perform an update of a time value based on a received time value if the network identifier received matches the network identifier of the network that the STA 106 is currently participating within. That is, a STA may decide to only update its clock based on messages received from other devices that are on the same network. At block 406b, the STA 106 may begin a contention procedure for transmitting the sync frame during the discovery interval. However, in some cases before the contention procedures allows for the STA 106 to transmit the sync frame, a sync frame may be received from another STA (e.g., STA 106b) during the discovery interval. As such, at decision block 408b, it is determined whether a sync frame is received from another STA 106b during the discovery interval. If a sync frame was received from another STA 106b, then at block 410b, transmission of the sync frame by the STA 106 is canceled. The received time stamp from STA 106b may then be used to potentially update the time of the STA 106 according to one or more criteria as described in the embodiments below. One potential criteria is shown in at decision block 412b where the STA 106 determines if the received time stamp is greater than a current time of the STA 106. If, the received timestamp is greater than the current time stamp of the STA 106, the STA 106 adopts the received time stamp for use in determining when to transmit and receive as shown in block 414b. Otherwise, the current time stamp of the STA 106 is not adopted. In another embodiment, the STA 106 may update its time value to the maximum of all received time stamps or otherwise provided by anyone or a combination of the embodiments described below. The timestamp of the STA 106 may not count in determining the maximum. This may ensure that a STA 106 that has a faster drift and has not transmitted its sync frame keeps its clock in sync. In some embodiments, the STA 106 may update its time value to the minimum of all received time stamps. This may be done in a manner similar to the manner discussed below with respect to using the maximum received time, but may use a minimum (slowest) received time value instead of a maximum (fastest) received time value.

If by decision block 408b, a sync frame is not received from another STA 106b during the discovery interval, at block 416b, the prepared sync frame is transmitted by the STA 106.

The criteria for updating a current time value of a STA 106 based on received time value from another STA 106b may further depend on the received signal strength indication (RSSI) of the STA 106. For example, based on the RSSI of the STA 106, even where a STA 106 receives a sync frame, it may nonetheless proceed with transmitting a sync frame it has prepared.

For example, FIG. 4C is a flowchart of a method for synchronization that is based on a received signal strength indication. Blocks, 402c, 404c, and 406c correspond to blocks 402b, 404b, 406b and 408b of FIG. 4B. If at block 406c it is determined that a sync frame is received from another STA 106b, then the current STA 106 timestamp may be updated as shown in blocks 408c and 410c, or based on other criteria, as described above with respect to blocks 410b and 412b of FIG. 4B. In addition, if at block 406c it is determined that a sync frame is received from another STA 106b, then at decision block 412c is it determined whether an RSSI of the STA 106 is above some threshold. The threshold may be known previously to the STA 106 as established by a pre-configured value. If the RSSI is above a threshold, then at block 414c, the sync frame transmission is canceled. However, if the RSSI of the STA 106 is less than the threshold as determined in decision block 412c, then the prepare sync frame is transmitted as shown in block 416c. As such, although a sync frame was received, in some cases the STA 106 nonetheless transmits a prepared sync frame. If no sync frame is received as determined in block 406c, then at block 416c the sync frame is transmitted similar to that described above with reference to FIG. 4B.

It should be appreciated that the RSSI threshold described above with reference to block 412c may be adaptive and based on different conditions. For example, the sync frame received from the other STA 106b may include an RSSI threshold that indicates that STAs that see the sync frame at that threshold would attempt to send their own sync frames. This allows adaptation based on RSSIs of neighbors in the NAN. For example, block 412c may determine whether the RSSI of the STA 106 is greater than an RSSI threshold received from the sync frame. As a further adaptation, in contrast to comparing the RSSI of the STA 106 to just one received RSSI threshold, the STA 106 may compare its RSSI with RSSI threshold received in multiple sync frames from multiple different STAs. For example, block 412 may determine whether the RSSI of the STA 106 is greater than the RSSI thresholds in all sync frames received and cancel the current sync frame transmission only if the RSSI of the STA 106 is greater than all received RSSI thresholds.

The criteria for updating the current clock value based on received sync frames may be based on a variety of criteria as is further described in the embodiments below. For example, as will be further described below, excessive drift may be detected. For example a STA 106 may filter out received clock values that indicate excessive drift before using the values obtained to update its own clock. The drift threshold for which clocks are filtered out may be based on a pre-determined maximum allowed clock drift. In other embodiment, the threshold may be dynamically determined.

In addition, a new STA 106c that arrives into a network such as a NAN may have a timestamp that is significantly different from the current time used throughout the network for synchronization of, for example, discovery intervals and periods. As such, in accordance with an embodiment, a discovery packet of the new STA 106c may include a timestamp based on a condition that if the STA 106c has received a timestamp from another STA 106 that is already in the NAN. In one aspect, all zeros in the time stamp field may be used as a NULL indication. In another aspect, an additional field may be included, for example in the discovery message, that indicates that a time stamp is present or can be used for synchronization.

Each of the STAs may evaluate the current time values of the clock signals received from the other STAs and adjust the time value of its clock signal to the maximum of the time values observed if its own clock has a lesser value. In other words, where T(X) defines the time value of a clock signal of a STA X, and where T_max defines a maximum time value of the time values received from other STAs, then:

$$T(X)=T\_max, \text{ if } T(X)<T\_max \qquad \text{Equation 1}$$

In some cases, setting the current time value of a clock signal of a STA 106 according to Equation 1, may result in setting the time value to an erroneous value that may disrupt the discovery packet transmission cycle. For example, STA Y may have a fast clock and may not update its clock as the clocks of other devices are of a lesser value than its own clock. Furthermore, STA A may not have transmitted a discovery packet with its fast clock value for a long period of time (e.g., as compared to average periods for transmitting a discovery packet with a clock value). In this case, when STA Y transmits a message with its fast clock value, the value may be far ahead of the current value of a receiving STA Z and the discovery packet transmission cycle may be disrupted with STA Z, for example, missing the discovery interval 302a. As such, it may be desirable to use different methods for synchronizing STAs in a peer-to-peer network.

According to some embodiments, rather than immediately setting the current time value to the maximum of the received time values, the STA 106 may perform some analysis of the received time values. For example, if the maximum time is significantly ahead and of the current time value of the STA 106, the STA 106 may either not adjust its current time value or make some other adjustment according to other data derived from the one or more received messages, or the STA 106 may wait for further messages before updating.

Figure 5:
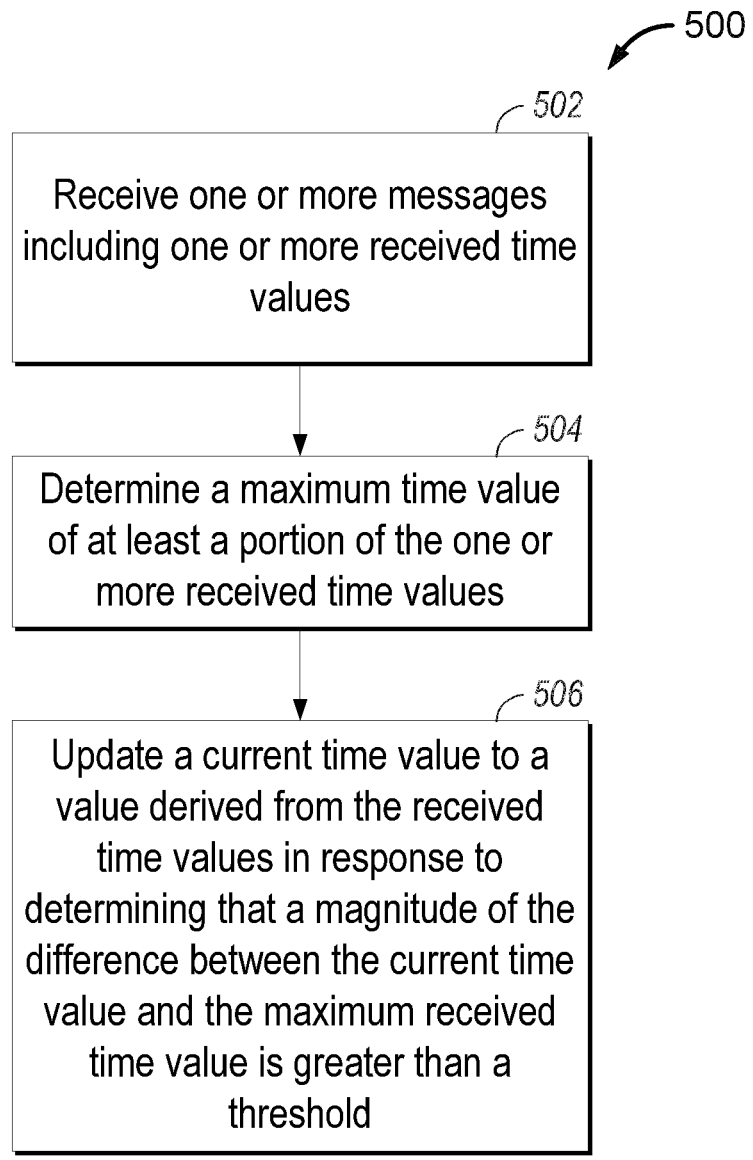
FIG. 5 is a flowchart of a method of synchronizing a wireless communications apparatus, in accordance with an embodiment.

FIG. 5 is a flowchart of a method 500 of synchronizing a wireless communications device, in accordance with an embodiment. Although the method 500 is described below with respect to the elements of the wireless device 202, those having ordinary skill in the art will appreciate that other components may be used to implement one or more of the blocks described herein. At block 502, one or more messages may be received including one or more received time values. For example a receiver 212 of a STA 106 may receive one or more messages including received time values from other STAs in the network. At block 504, a maximum time value of at least a portion of the received time values may be determined. For example, a processor 204 determines the maximum time value that may correspond to the time value that is the farthest ahead in time of at least some portion of the received time values. At block 506, a current time value is updated to a value derived from the received time values if a magnitude of the difference between the current time value and the maximum received time value is greater than a threshold. Stated another way, the processor 204 may update the time value to a value derived from the one or more received time values in response to determining that a magnitude of the difference between the current time value of that STA 106 and the maximum received time value is greater than a threshold. For example, the processor 204 may update the current time value (e.g., of a clock 224) to the derived time value if the magnitude of the difference as compared to the maximum received time value is greater than a threshold. In some embodiments, the value may correspond to different methods for comparing the current time value with the maximum time value. The derived time value may be determined in a variety of ways. For example, the derived time value may be the maximum received time value as determined in block 504. Furthermore, the derived time value may correspond to the average of the received time values.

For example, where T(X) defines the time value of a clock signal of a STA X, and where T_max defines a maximum time value of the time values received from other STAs, then:

$$T(X)=T\_max, \text{ if } |T(X)-T\_max|>\text{Threshold} \qquad \text{Equation 2}$$

As such, in Equation 2, T_max may be the derived time value. The threshold may correspond to, for example a value that may result in disturbing the discovery process. It should be appreciated that other comparisons may be used to determine when to set the current time value to the maximum received time value.

Figure 6:
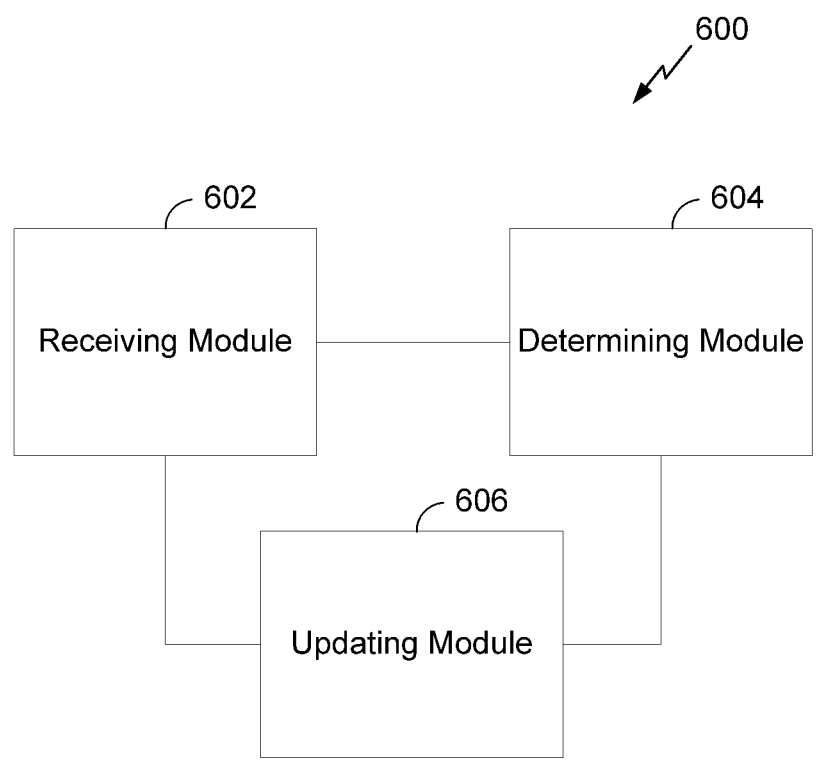
FIG. 6 is a functional block diagram of an exemplary wireless communication apparatus that may be employed with the wireless communication system of FIG. 1A or FIG. 1B.

FIG. 6 is a functional block diagram of an exemplary wireless communication device 600 that may be employed with the wireless communication system of FIG. 1A or FIG. 1B. The wireless device 600 may include a receiving module 602. The receiving module 602 may the receiver 212, transceiver 214, and/or memory 206. In one aspect, means for receiving may include the receiving module 602. The receiving module 602 may be configured to perform one or more of the functions described above with respect to block 502 of FIG. 5. The wireless device 600 may further include a determining module 604. The determining module 604 may include the processor 204 and/or memory 206 of FIG. 2. In one aspect, means for determining may include the determining module 604. The determining module 604 may be configured to perform one or more of the functions described above with respect to block 504 of FIG. 5. The wireless device 600 may include an updating module 606. The updating module 606 may further include a processor 204 as shown in FIG. 2. In one aspect, means for updating may include the updating module 606. The updating module 606 may be configured to perform one or more of the functions described above with reference to block 506 of FIG. 5.

Figure 7:
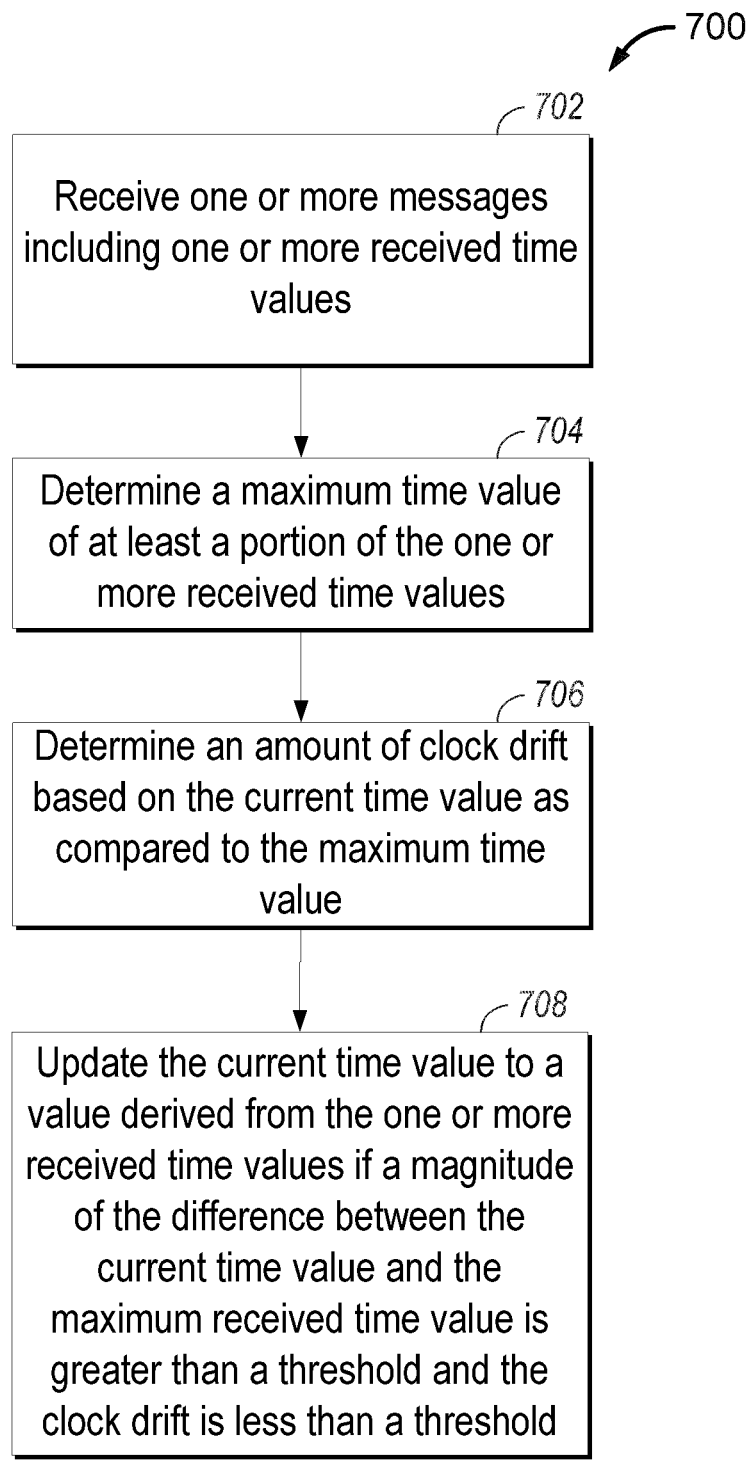
FIG. 7 is a flowchart of another method of synchronizing a wireless communications apparatus, in accordance with an embodiment.

In addition to comparing the maximum received time value with the current time value before updating, an amount of excessive drift may be determined to determine when to update. FIG. 7 is a flowchart of another method 700 of synchronizing a wireless communications device, in accordance with an embodiment. Although the method 700 is described below with respect to the elements of the wireless device 202, those having ordinary skill in the art will appreciate that other components may be used to implement one or more of the blocks described herein.

As described above with reference to FIG. 5, blocks 702 and 704 correspond to blocks 502 and 504 of FIG. 5. At block 706, an amount of clock drift is determined based on the current time value of a STA 106 as compared to the maximum received time value. For example, a processor 204 may be configured to determine the amount of clock drift. At block 708, the current time value is updated to a value derived from the one or more received time values if a magnitude of the difference between the current time value and the maximum received time value is greater than a threshold (as described above with reference to FIGS. 5-6) and the clock drift is less than a threshold. The drift may be determined with respect to a time interval between the last time the clock signal was updated and the current time. For example, according to an embodiment, where T(X) defines the time value of a clock signal of a STA X, where T_max defines a maximum time value of the time values received from other STAs, and where $T_{interval}$ defines the interval between the last time the clock was updated and the current time then:

$$T(X) = T_{max}, \text{ if } |T(X) - T\_max| > \text{Threshold and } \frac{|T(X) - T\_max|}{T_{interval}} < \text{Drift Threshold} \qquad \text{Equation 3}$$

It should be appreciated that T(X) may be set to some value derived from the one or more received time values in Equation three, as described above with reference to FIG. 5. In this way, the STA 106 may detect, for example if the clock drifts by more than 1 or 2% that there is a rogue clock value and the STA 106 should wait to update the current clock value or use some other time value for the update. Stated another way, in addition to the conditions described above with reference to FIG. 5, updating may be further in response to determining that a ratio of the difference between the maximum time value and the current time value to some drift time interval is less than a threshold.

Figure 8:
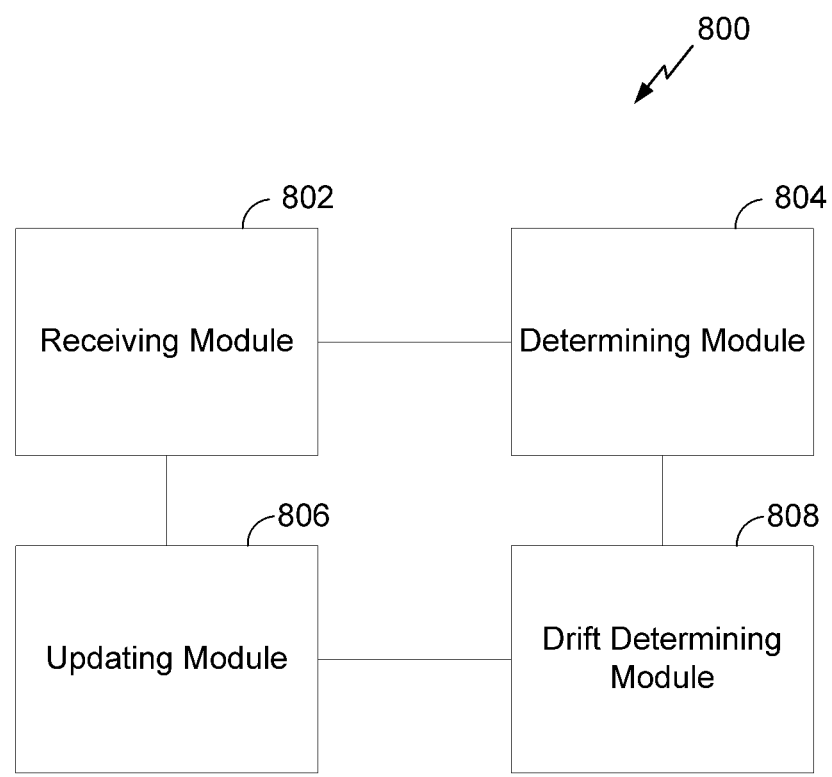
FIG. 8 is a functional block diagram of an exemplary wireless communication apparatus that may be employed with the wireless communication system of FIG. 1A or FIG. 1B.

FIG. 8 is a functional block diagram of an exemplary wireless communication device 800 that may be employed with the wireless communication system of FIG. 1A or FIG. 1B. The wireless device 800 may include a receiving module 802. The receiving module 802 may the receiver 212, transceiver 214, and/or memory 206. In one aspect, means for receiving may include the receiving module 802. The receiving module 802 may be configured to perform one or more of the functions described above with respect to block 702 of FIGS. 7. The wireless device 800 may further include a determining module 804. The determining module 804 may include the processor 204 and/or memory 206 of FIG. 2. In one aspect, means for determining may include the determining module 804. The determining module 804 may be configured to perform one or more of the functions described above with respect to block 704 of FIG. 7. The wireless device 800 may include a drift determining module 808. In one aspect, the drift determining module 808 may include the processor 204 of FIG. 2. In one aspect, a means for determining drift may include the drift determining module. The drift determining module may be configured to perform one or more of the functions described above with reference to block 706 of FIG. 7. The wireless device 800 may include an updating module 806. The updating module 806 may further include a processor 204 as shown in FIG. 2. In one aspect, means for updating may include the updating module 806. The updating module 806 may be configured to perform one or more of the functions described above with reference to block 708 of FIG. 7.

In further embodiments, before determining the maximum time value, the STA 106 may filter the received time values to detect erroneous or otherwise less accurate time values. The filtered out time values may correspond to time values that, if used by the STA 106, would disrupt a discovery process, for example. For example, as described above, the maximum time value may be determined from just a portion of the one or more received time values, where the portion corresponds to time values not filtered out.

Figure 9:
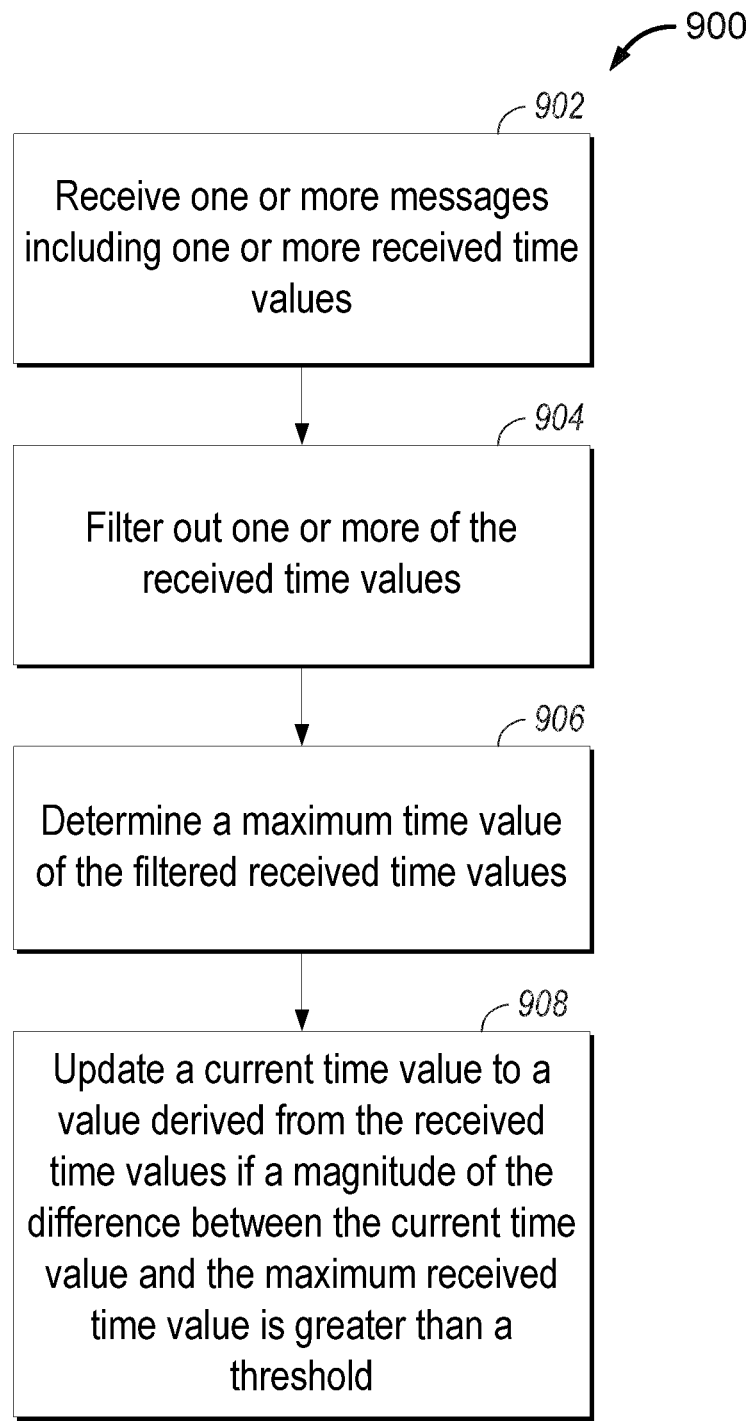
FIG. 9 is a flowchart of another method of synchronizing a wireless communications apparatus, in accordance with an embodiment.

FIG. 9 is a flowchart of another method of synchronizing a wireless communications device, in accordance with an embodiment. Although the method 900 is described below with respect to the elements of the wireless device 202, those having ordinary skill in the art will appreciate that other components may be used to implement one or more of the blocks described herein.

At block 902, the STA 106 may receive one or more messages including one or more received time values of other STAs in the network. At block 904, one or more of the received time values is filtered out. For example, the filtered out time values may correspond to time values whose drift as compared to the current time value is greater than a threshold. A processor 204 may be configured to filter the time values. At block 906, a maximum time value of the filtered received time values is determined. A processor 204 may further determine the maximum received time value. At block 908, a current time value is updated to a value derived from the received time values if a magnitude of the difference between the current time value and the maximum received time value is greater than a threshold. The derived value may correspond to the values described above with reference to FIG. 5. In some aspects, the current time value may be compared to the derived value, such as determining a magnitude of the difference between the current time value and the derived time value.

As an example, the STA 106 may filter out time values that have excessive drift. For example, according to an embodiment, where T(X) defines the time value of a clock signal of a STA X, where $T_{interval}$ defines the interval between the last time the clock was updated and the current time, and where T(i), i=1 ......N defines clock values of devices that have been received then:

$$T\_max = \text{maximum}\left(T(X), T(i) \text{ for all } i = 1 \ldots N, \text{ such that } \frac{|T(X) - T(i)|}{T_{interval}} < \text{Drift Threshold}\right) \qquad \text{Equation 4}$$

The drift threshold may be based on a maximum allowed clock drift tolerance that may be dynamically determined or predetermined. As such, T_max is the maximum of only those received time values that have not drifted as compared to the current time value more than a certain amount. Using the new filtered value of T_max:

$$T(X) = T\_max, \text{ if } |T(X) - T\_max| > \text{Threshold} \qquad \text{Equation 5}$$

It should be appreciated that T(X) may be set to a value derived from the received time values according to Equation 5 as described above with reference to FIG. 5. Filtering may further be accomplished in other ways. For example, as is further described below, the received time values from other STAs may be received along with information relating to the accuracy of the received time values. Some value may be transmitted that might indicate the confidence or accuracy of the time value. For example, if the received time value corresponds to a STA 106 that has not updated its time value for a significant amount of time, the received time value may be received information indicating that the received time value is not as accurate. In one aspect, GPS information may be included. This information may be used to rank or prioritize the received time values according to predicted accuracy. As such, filtering may take this information into account.

Figure 10:
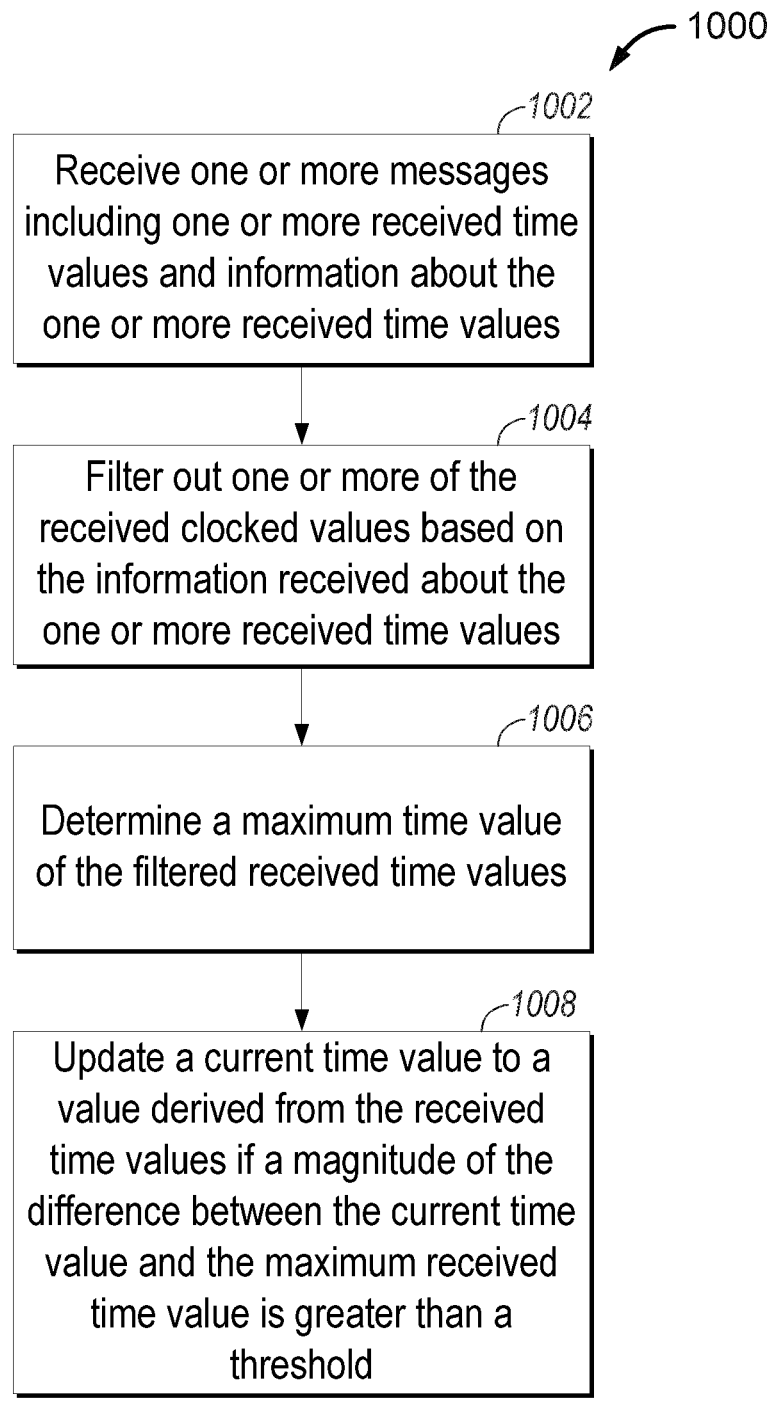
FIG. 10 is a flowchart of another method of synchronizing a wireless communications apparatus, in accordance with an embodiment.

FIG. 10 is a flowchart of another method of synchronizing a wireless communications device, in accordance with an embodiment. Although the method 1000 is described below with respect to the elements of the wireless device 202, those having ordinary skill in the art will appreciate that other components may be used to implement one or more of the blocks described herein. At block 1002, a STA 106 receives one or more messages including one or more received time values and information about the one or more received time values. At block 1004, one or more of the received time values may be filtered out based on the information received about the one or more time values. As described above the information may relate to the accuracy or confidence that the received time value could be used to update a current time value of the STA 106. AT block 1006, a maximum time value is determined of the filtered received time values. At block 1008, the current time value is updated to a value derived from the received time values if a magnitude of the difference between the current time value and the maximum received time value is greater than a threshold.

In addition, filtering may be done using statistical analysis of the received time intervals. For example, the received time intervals may be mapped into a histogram or other similar construct. The histogram or other statistical construct may then be analyzed by the processor 204 to filter out different time intervals based on some criteria. For example, those received values that are further than one or two standard deviations, for example, from a mean of the received time values may not be used in the update process. Other statistical analysis is further contemplated to filter the time values.

Figure 11:
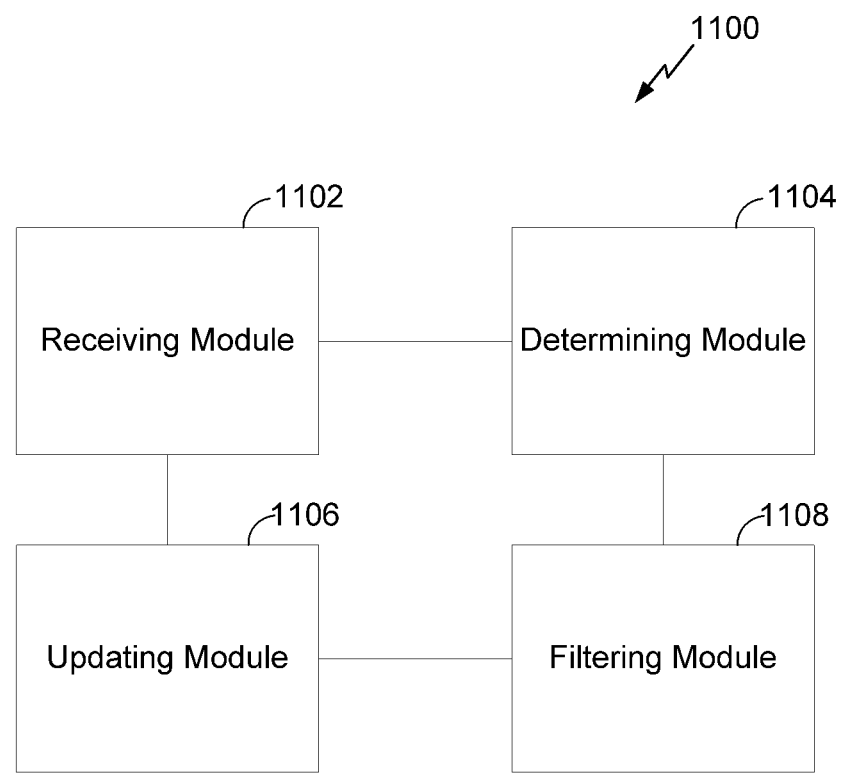
FIG. 11 is a functional block diagram of an exemplary wireless communication apparatus that may be employed with the wireless communication system of FIG. 1A or FIG. 1B.

FIG. 11 is a functional block diagram of an exemplary wireless communication device 1100 that may be employed with the wireless communication system of FIG. 1A or FIG. 1B. The wireless device 1100 may include a receiving module 1102. The receiving module 1102 may the receiver 212, transceiver 214, and/or memory 206. In one aspect, means for receiving may include the receiving module 1102. The receiving module 1102 may be configured to perform one or more of the functions described above with respect to blocks 902 or 1002 of FIGS. 9 and 10. The wireless device 1100 may further include a filtering module 1108. A processor 204 and memory may be included in the filtering module 1108. In one aspect, means for filtering may include the filtering module 1108. The filtering module 1108 may be configured to perform one or more of the functions described with reference to blocks 904 or 1004 of FIGS. 9 and 10. The wireless device 1100 may further include a determining module 1104. The determining module 1104 may include the processor 204 and/or memory 206 of FIG. 2. In one aspect, means for determining may include the determining module 1104. The determining module 1104 may be configured to perform one or more of the functions described above with respect to blocks 906 or 1006 of FIGS. 9 and 10. The wireless device 1100 may include an updating module 1106. The updating module 1106 may further include a processor 204 as shown in FIG. 2. In one aspect, means for updating may include the updating module 1106. The updating module 1106 may be configured to perform one or more of the functions described above with reference to blocks 908 or 1008 of FIGS. 9 and 10.

Figure 12:
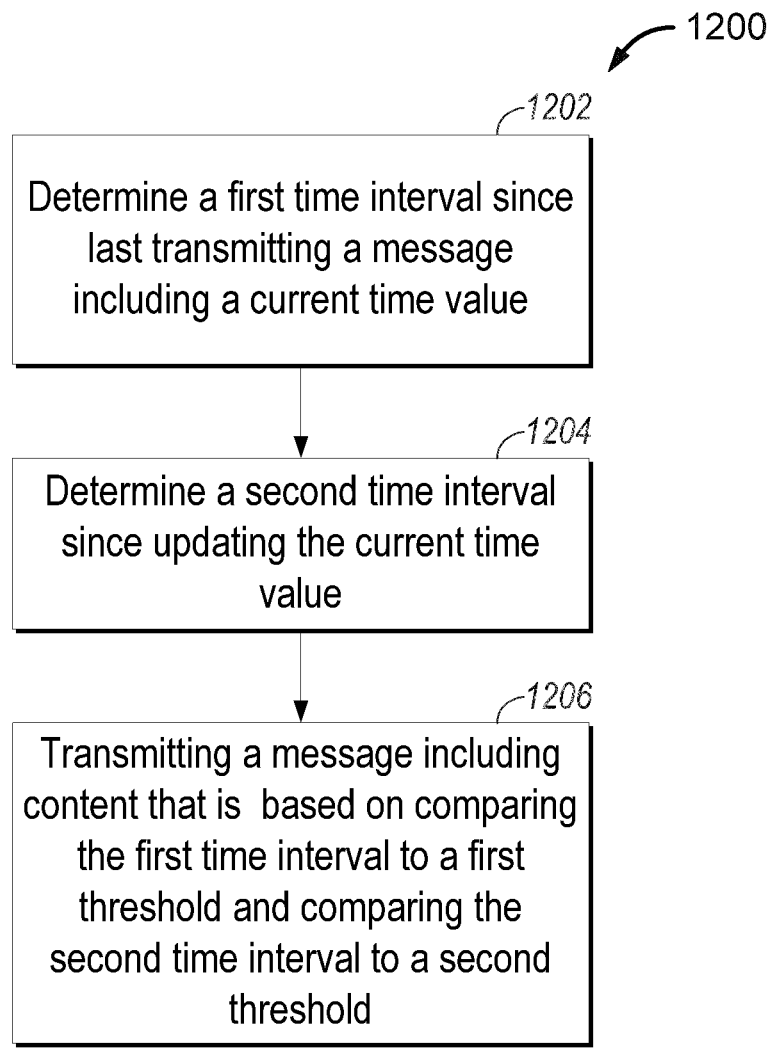
FIG. 12 is a flowchart of another method of synchronizing a wireless communications apparatus, in accordance with an embodiment.

In addition to further analysis of received time values, a STA 106 may further take certain actions when transmitting time values to aid in synchronization. For example, the STA 106 may be configured to transmit its time value only if certain conditions are met, or may wish to transmit information relating to the accuracy of the time interval transmitted by the STA 106. FIG. 12 is a flowchart of another method of synchronizing a wireless communications device, in accordance with an embodiment. Although the method 1200 is described below with respect to the elements of the wireless device 202, those having ordinary skill in the art will appreciate that other components may be used to implement one or more of the blocks described herein.

At block 1202, a first time interval since last transmitting a message including a current time value is determined. This may correspond to a STA 106 that has not sent out its time information for a significant amount of time (e.g., one hundred seconds). At block 1204, a second time interval since updating the current time value may be determined. For example, this may correspond to a STA 106 that has not updated its time value for a significant amount of time (e.g., because the STA 106 was sleeping and more clock drift may occur). At block 1206, a message may be transmitted that is based on comparing the first time interval to a first threshold and comparing the second time interval to a second threshold.

For example, in one embodiment, the STA 106 may not include its own clock in a discovery packet if it has not sent out its time information according to some threshold or if it has not updated its time based on other received time intervals. In another embodiment, the STA 106 might send information relating to the accuracy of the time interval that might indicate how accurate the time interval is for purposes of synchronization. For example, in one embodiment, a STA 106 may include a bit in the discovery packet that indicates that the clock time transmitted may not be used for synchronization purposes.

Figure 13:
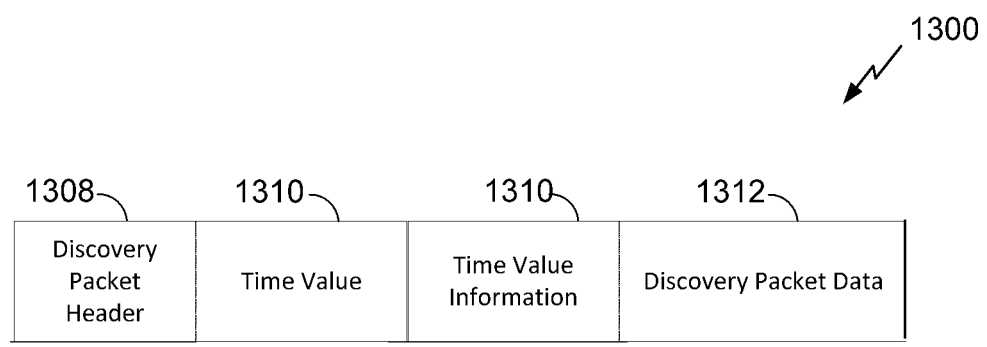
FIG. 13 illustrates a message that may include a time value for synchronization.

FIG. 13 illustrates a message 1300 that may include a time value 1310 for synchronization. The message 1300 may correspond to a discovery packet in some implementations. The message 1300 may include header information 1308. The message 1300 may include a time value 1310 corresponding to a current time value of a clock signal (e.g., a timestamp). In addition the message 1300 may include time value information 1310 that may relate to the accuracy of the time value or how it might be used in synchronization. The message 1300 may further include discovery packet data 1312.

Figure 14:
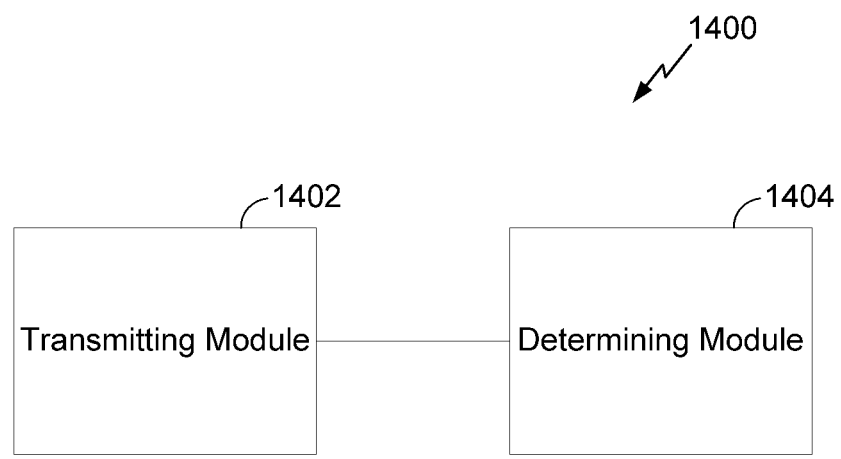
FIG. 14 is a functional block diagram of an exemplary wireless communication apparatus that may be employed with the wireless communication system of FIG. 1A or FIG. 1B.

FIG. 14 is a functional block diagram of an exemplary wireless communication device that may be employed with the wireless communication system of FIG. 1A or FIG. 1B. The wireless device 1400 may include a determining module 1404. In one aspect, the determining module 1404 may include a processor. In one aspect, means for determining may include the determining module 1404. The determining module 1404 may be configured to perform one or more of the functions described above with reference to blocks 1202 and 1204 of FIG. 12. The wireless device 1400 may include a transmitting module 1402. The receiving module 1402 may the transmitter 210, transceiver 214, and/or memory 206. In one aspect, means for transmitting may include the transmitting module 1402. The receiving module 1402 may be configured to perform one or more of the functions described above with respect to block 1206 of FIG. 12.

Figure 15:
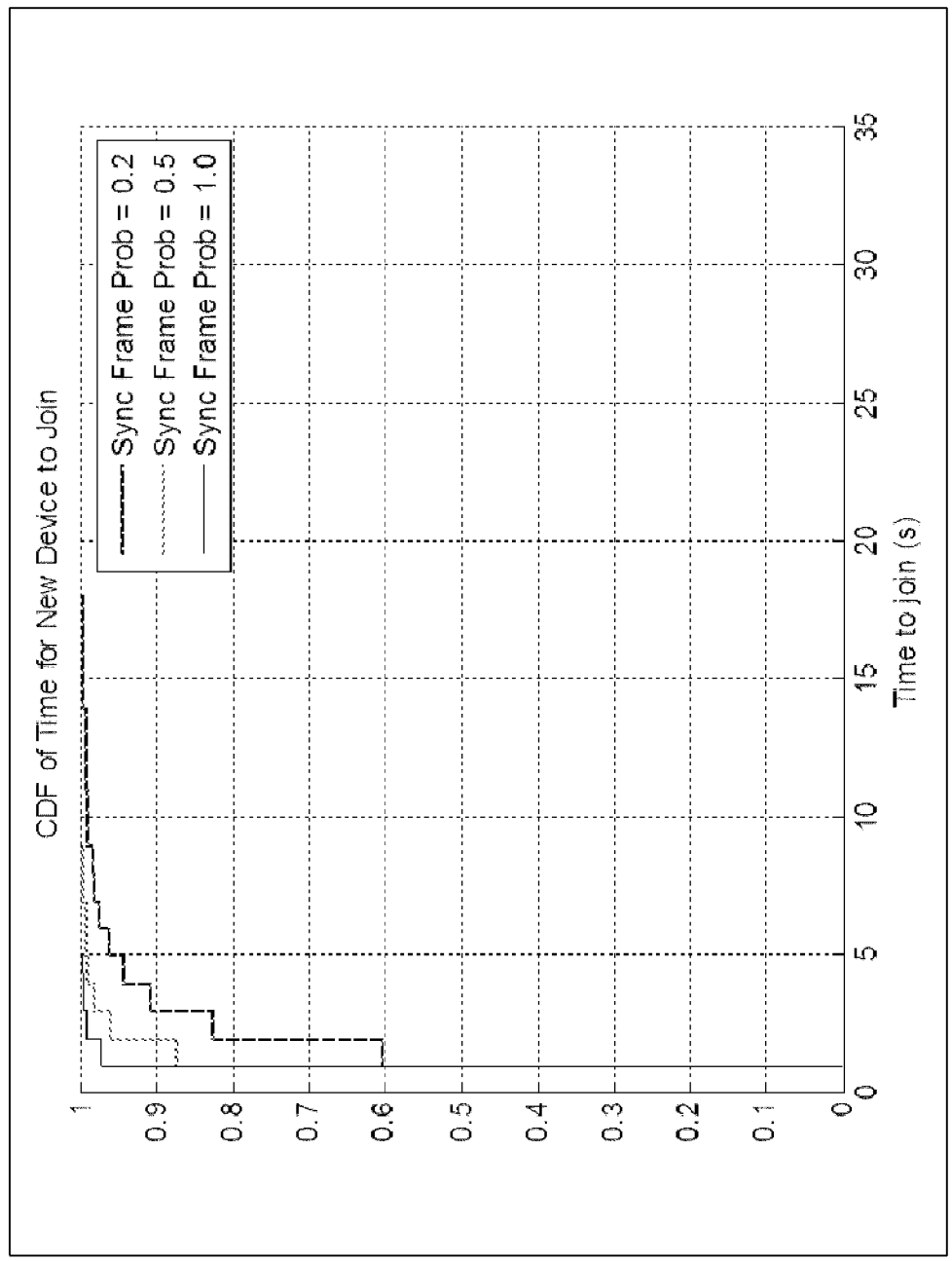
FIG. 15 is a plot showing exemplary values for how much time may be needed to join a NAN network based on different sync frame probabilities.

FIG. 15 is a plot showing exemplary values for how much time may be needed to join a NAN network based on different sync frame probabilities. For example, as a non-limiting example, there may be fifty STAs in the NAN spread out in a 400×400 area. As one example, each STA 106 may have a transmission range of 80 meters (e.g., for example based on mobile transmit power 18 dBm with a 5 dB noise figure for one channel model ad 8 dB additional pathloss. In this scenario, fifty new devices may want to join and they each need to hear at least one sync frame. FIG. 15 shows exemplary times for joining the network for three different exemplary P_sync values, 1.0, 0.5, and 0.2. As shown, even with P_sync equal to 0.2, in an exemplary case over ninety percent of the new devices obtain a sync frame within five discovery periods.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for synchronizing a wireless communication apparatus, the method comprising:
    receiving, at the wireless communication apparatus, one or more messages including one or more received time values; and
    updating a time value of a clock signal of the wireless communication apparatus to a value derived from the received time values in response to determining that a magnitude of a difference between the time value and the derived value is greater than a first threshold and that a ratio of the magnitude of the difference to a time interval is less than a second threshold.

2. The method of claim 1, wherein the derived value comprises an average of the one or more received time values.

3. The method of claim 1, wherein the derived value comprises a maximum received time value.

4. The method of claim 1, wherein the derived value comprises a minimum received time value.

5. The method of claim 1, wherein the time interval is defined by a time when the time value was previously updated and a current time value.

6. The method of claim 1, wherein the threshold is a first threshold, and wherein updating the time value of the clock signal of the wireless communication apparatus is further in response to determining that the magnitude of the difference is greater than the first threshold and an amount of drift of the derived time value during a time interval is less than a drift threshold.

7. The method of claim 1, further comprising filtering the received time values to determine the derived time value, wherein filtering comprises including, in the at least a portion of the one or more received time values, only received time values whose drift from the time value of the wireless communications apparatus is less than a drift threshold.

8. The method of claim 1, further comprising filtering the received time values to determine the derived time value, wherein filtering comprises including, in the at least a portion of the one or more received time values, only received time values with differences between the time value divided by a time interval is less than a drift threshold.

9. The method of claim 1, further comprising filtering the received time values to determine the derived time value, wherein filtering comprises including, in the at least a portion of the one or more received time values, only received time values with a deviation from a mean time value computed from the received time values and the time value is less than a drift threshold.

10. The method of claim 1, wherein the one or more messages comprise information relating to accuracy levels of the one or more received time values, wherein the method further comprises filtering the received time values to determine the derived time values based at least in part on the information relating to the accuracy levels.

11. The method of claim 1, further comprising synchronizing transmitting and receiving wireless communications based on the time value.

12. The method of claim 1, wherein the wireless communication apparatus is configured to transmit and receive wireless communications according to a protocol based on an 802.11 protocol.

13. The method of claim 1, wherein the one or more messages is a discovery message configured to advertise one or more services to the wireless communication apparatus.

14. A wireless apparatus operable in a wireless communication system comprising:
    a receiver configured to receive one or more messages including one or more received time values; and
    a processor configured to update a time value of a clock signal of the wireless communication apparatus to a value derived from the received time values in response to determining that a magnitude of a difference between the time value and the derived time value is greater than a first threshold and that a ratio of the magnitude of the difference to a time interval is less than a second threshold.

15. A wireless apparatus operable in a wireless communication system comprising:
    means for receiving one or more messages including one or more received time values; and
    means for updating a time value of a clock signal of the wireless communication apparatus to a value derived from the received time values in response to determining that a magnitude of a difference between the time value and the derived time value is greater than a first threshold and that a ratio of the magnitude of the difference to a time interval is less than a second threshold.

16. A computer program product, comprising:
    a non-transitory computer readable medium comprising:
        code for receiving one or more messages including one or more received time values; and
        code for updating a time value of a clock signal of the wireless communication apparatus to a value derived from the received time values in response to determining that a magnitude of a difference between the time value and the derived time value is greater than a first threshold and that a ratio of the magnitude of the difference to a time interval is less than a second threshold.

* * * * *